United States Patent [19]

Yazu et al.

[11] Patent Number: 4,632,817

[45] Date of Patent: Dec. 30, 1986

[54] METHOD OF SYNTHESIZING DIAMOND

[75] Inventors: Shuji Yazu; Kazuo Tsuji; Akito Yoshida, all of Itami, Japan

[73] Assignee: Sumitomo Electric Industries, Ltd., Osaka, Japan

[21] Appl. No.: 717,074

[22] Filed: Mar. 28, 1985

[30] Foreign Application Priority Data

Apr. 4, 1984 [JP] Japan .................................. 59-67855
Mar. 15, 1985 [JP] Japan .................................. 60-52942

[51] Int. Cl.$^4$ ............................................. C01B 31/06
[52] U.S. Cl. ............................ 423/446; 156/DIG. 68
[58] Field of Search ................ 423/446; 156/DIG. 68

[56] References Cited

U.S. PATENT DOCUMENTS

| | | |
|---|---|---|
| 3,297,407 | 1/1967 | Wentorf, Jr. .......................... 423/446 |
| 3,423,717 | 1/1969 | Bovenkerk ........................... 423/446 |
| 4,287,168 | 9/1981 | Wentorf, Jr. et al. ............... 423/446 |
| 4,322,396 | 3/1982 | Strong ................................. 423/446 |

OTHER PUBLICATIONS

Journal of Physical Chemistry, vol. 75, No. 12, 1971, pp. 1833-1837, "Some Studies of Diamond Growth Rates", R. H. Wentorf.

Japanese Patent Laying Open Gazette Nos. 88289/1977, 69211/1981.

Primary Examiner—John Doll
Assistant Examiner—Jackson Leeds
Attorney, Agent, or Firm—Staas & Halsey

[57] ABSTRACT

A diamond synthesizing method carried out under diamond-stable superhigh pressure and temperature by employing a synthesizing vessel (10) having a plurality of synthesizing chambers (10a, 10b) divided by a partition layer (16) in the vertical direction. Solvent metals (13a, 13b) respectively placed in the upwardly arranged synthesizing chamber (10a) and the downwardly arranged synthesizing chamber (10b) are prepared so that the solvent metals are different in eutectic temperature with carbon from each other. In the respective synthesizing chambers (10a, 10b), carbon sources (12a, 12b) are placed in contact with highest-temperature portions of the respective solvent metals (13a, 13b) and seed crystals (11a, 11b) are placed in contact with lowest-temperature portions thereof. The synthesizing vessel (10) is provided with a temperature gradient in such directivity that the upper part thereof is at a higher temperature and the lower part is at a lower temperature.

13 Claims, 8 Drawing Figures

FIG.1

PRIOR ART

METHOD OF SYNTHESIZING DIAMOND

BACKGROUND OF THE INVENTION

1. Field of the Invention

The present invention relates to a method of efficiently producing a plurality of diamond crystals, and more specifically, it relates to a method of synthesizing diamond crystals by growing diamond on diamond seed crystals.

2. Description of the Prior Art

Diamond is a material having the highest hardness and modulus of elasticity among the existing materials. Further, extremely pure diamond has such superior characteristics that it has the highest thermal conductivity and high transmittance of light in infrared regions. Thus, diamond is one of the precious resources that cannot be replaced by other materials.

There are generally two types of methods for synthesizing diamond. In one of such methods, carbon material is mixed or brought into contact with a solvent metal such as iron, cobalt or nickel to be subjected to diamond-stable superhigh pressure and temperature whereby the carbon is converted into diamond under the action of the solvent metal. According to such method, the solvent metal penetrates into the carbon material (generally prepared by graphite), whereby the carbon is caused to diffuse through the solvent metal which is in the form of a thin film, to generate diamond. The driving force for diamond generation in this method is the difference in solubility between graphite and diamond with respect to the solvent metal under a constant temperature. According to this method, diamond is spontaneously nucleated, and rapidly grows until it reaches a certain size. A considerable quantity of fine diamond powder has generally been synthesized by this method to be applied to, e.g., abrasives.

However, larger diamond crystals of high quality cannot be synthesized by the aforementioned method.

Figure 1:
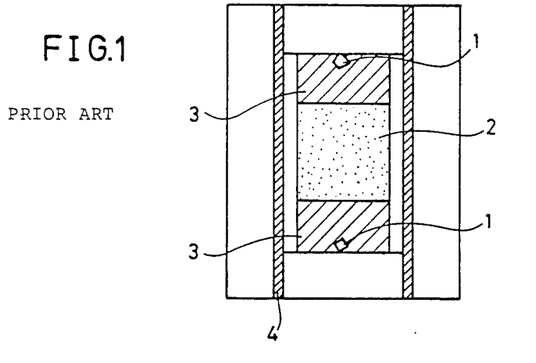
FIG. 1 is a cross sectional view showing an example of a diamond synthesizing vessel employed in a conventional diamond synthesizing method.

On the other hand, a method of synthesizing large diamond crystals of good quality is disclosed in U.S. patent No. 3,297,407 issued on Jan. 10, 1967 to R. H. Wentorf, Jr. FIG. 1 roughly illustrates a synthesizing vessel as employed in this method. Such prior art method is now described with reference to FIG. 1.

Diamond seed crystals 1 are located in upper and lower portions of the synthesizing vessel as shown in FIG. 1. A carbon source 2 is provided between the two diamond seed crystals 1, with solvent metal layers 3 arranged in the upper and lower sides of the carbon source 2. A cylindrical heater 4 is adapted to heat the synthesizing vessel.

The synthesizing vessel in the above structure is heated to the maximum temperature at its central portion in the axial, i.e., vertical direction, while the upper and lower end portions thereof are heated at relatively low temperatures.

Carbon dissolved in the solvent metal layers 3 under diamond-stable superhigh pressure and temperature is precipitated as diamond on the seed crystals 1, which are under relatively low temperatures. This method utilizes the difference in solubility of carbon with respect to the solvent metal based on temperature difference, and is called a temperature difference method. Such temperature difference method enables growth of diamond only from diamond seed crystals, while enabling control of diamond growth rate by maintaining the temperature difference at a prescribed value. Therefore, a large diamond of one carat size can be laboratorially synthesized according to said method.

However, in the aforementioned temperature difference method, a superhigh pressure generator required for the synthesis process is extremely expensive and a considerable time is required for the synthesis process. Therefore, the cost for synthesizing diamond is greatly increased, and hence no large diamond has been produced in the industrial field in practice.

Figure 2:
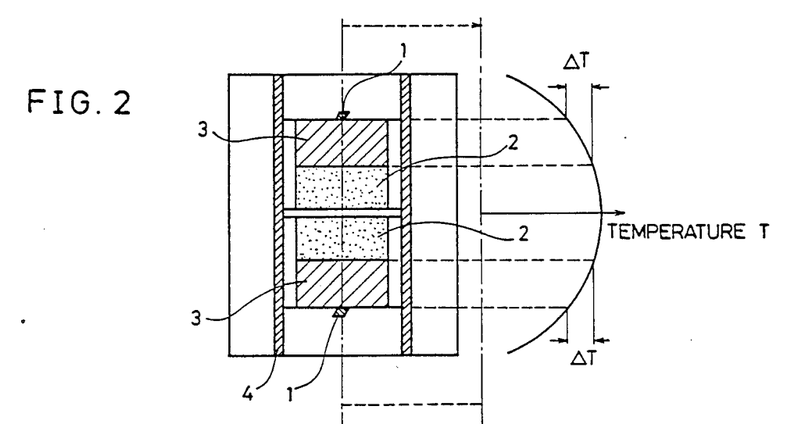
FIG. 2 is a schematic cross sectional view showing another example of a diamond synthesizing vessel employed in a conventional temperature difference method, in which a temperature gradient is also shown in the right-hand side of the synthesizing vessel.

The technique of synthesizing diamond based on the aforementioned temperature difference method is further described in "Some Studies of Diamond Growth Rates" by R. H. Wentorf, Jr., the Journal of Physical Chemistry, Vol. 75, No. 12, 1971, pp. 1833–1837. FIG. 2 shows a synthesizing vessel employed in the prior art as disclosed in this literature. The difference between the synthesizing vessels as shown in FIGS. 1 and 2 resides in that a partition wall is provided at the central portion in the axial, i.e., vertical direction of the vessel as shown in FIG. 2, and both vessels are substantially identical to each other in other points. As also shown in FIG. 2, the synthesizing vessel is provided with vertically symmetrical temperature distribution such that the vessel is under a relatively high temperature at its axial center, with temperatures being lowered toward the upper and lower ends thereof.

According to an experiment made in practice in the synthesizing vessel as shown in FIG. 2, a large diamond crystal of good quality can be synthesized in the lower part of the vessel, whereas no good diamond crystal can be grown in the upper part thereof even if the temperature distribution and materials of components are prepared to be the same as those of the lower part. The reason for this is described in the aforementioned literature by Wentorf, Jr. (see pages 1834 to 1835), and is considered to be based on the action of gravity. In other words, when the solvent metal is molten and carbon is dissolved in the solvent metal, the solvent metal is reduced in specific gravity. Such reduction in specific gravity follows increase in temperature. Under such circumstances, dissolution of the carbon in the solvent metal is caused in the upper end portion of the solvent metal in the lower part of the synthesizing vessel, while the temperature is raised higher in the said upper end. However, the result is contrary to this in the upper part of the synthesizing vessel. Thus, the specific gravity of the solvent metal is at the minimum in the lower end of the upper vessel part, whereby convection is caused by the action of gravity. Consequently, the carbon is excessively supplied to the upper end on which the seed crystal is located, leading to impossibility in retaining the appropriate rate for growing good diamond crystals. Thus, according to the conventional method of synthesizing diamond based on the temperature difference, good diamond crystals can be synthesized only in the lower part of the synthesizing vessel as shown in FIG. 2. Therefore, the cost for synthesizing diamond is further increased in the conventional method utilizing the temperature difference method.

Another example of a method of synthesizing diamond on the basis of temperature difference is disclosed in Japanese patent laying open gazette No. 88289/1977, which points out other disadvantages of the conventional method of synthesizing diamond by the temperature difference method. The disadvantages pointed out in the prior art literature are that, in the conventional process of synthesizing diamond based on the temperature difference method, spontaneous nucleation takes place in portions other than the seed crystals thereby to reduce the yield of synthesized diamond crystals as grown on the seed crystals, that it is difficult to obtain diamond crystals of uniform quality and size, and that grown diamond crystals tend to be cracked. The Japanese patent laying open gazette No. 88289/1977 then discloses a method of preventing generation of diamond crystals in portions other than the seed crystals. This method comprises a step of placing a shielding layer for preventing nucleation between the solvent metal layer and the seed crystals, which shielding layer is prepared by a transition metal such as cobalt (Co), iron (Fe) and manganese (Mn) applicable as a solvent to diamond or a carbide-generating element such as titanium (Ti), chromium (Cr) and tungsten (W).

However, according to experiments made by the inventors, it has been found that the method disclosed in Japanese patent laying open gazette No. 88289/1977 still has the following disadvantages: Although the transition metal such as Co, Fe and Mn can effectively be employed as the material for the shielding layer for preventing nucleation when the solvent metal is prepared by a metal having low carbon solubility such as nickel (Ni) or Fe-Ni alloy, such shielding layer of the transition metal cannot effectively prevent nucleation when the solvent metal is prepared by that having high carbon solubility such as Fe, Co or an alloy mainly composed of these metals. Further, employment of the element which generates a carbide, such as W and Cr, leads to deterioration in quality of finally obtained diamond crystals, which is not preferable since fine crystals of carbides such as W and Cr generated simultaneously with the diamond crystals tend to be trapped in the diamond crystals.

SUMMARY OF THE INVENTION

Accordingly, the principal object of the present invention is to provide a diamond synthesizing method which can synthesize a number of large diamond crystals of high quality simultaneously from a plurality of seed crystals.

Another object of the present invention is to provide a diamond synthesizing method which can effectively prevent nucleation in portions other than seed crystals thereby to obtain large diamond crystals of high quality.

Briefly stated, in accordance with a broad aspect of the present invention there is provided a method of synthesizing diamond by employing carbon sources, solvent metals for dissolving the carbon sources and seed crystals under diamond-stable superhigh pressure and temperature thereby to grow diamond crystals, which method comprises a step of preparing a synthesizing vessel divided into at least two synthesizing chambers by partition layer(s), a step of placing the solvent metal layers different from each other in eutectic temperature with respect to carbon and placing the carbon sources to be in contact with highest-temperature portions of the solvent metal layers while placing the seed crystals to be in contact with the lowest-temperature portions thereof in the respective ones of the divided synthesizing chambers, and a step of growing diamond crystals in the solvent metal layers in the respective synthesizing chambers.

Preferably the divided synthesizing chambers are arranged in a plurality of stages in the vertical direction and at least one cylindrical heater is arranged on the outer periphery of the synthesizing vessel for heating the synthesizing vessel, to provide the same with a temperature gradient in such directivity that the upper part in the axial direction of the synthesizing vessel is heated at a higher temperature and the lower part at a lower temperature. The solvent metal layers are placed in the upper and lower synthesizing chambers from top to bottom in order of eutectic temperatures thereof with respect to carbon. The carbon sources can be placed to be in contact with the upper portions of the solvent metal layers while the seed crystals can be placed to be in contact with the lower portions of the solvent metal layers in the respective synthesizing chambers.

According to the present invention having the aforementioned structure, large diamond crystals of high quality can simultaneously be produced at a low cost.

Further, in a specific aspect of the present invention, a plurality of seed crystals are placed with respect to one solvent layer preferably in a concentration in excess of $1/cm^2$ with respect to effective regions capable of growing crystals in each of the divided synthesizing chambers, thereby to effectively prevent nucleation in portions other than the seed crystals.

The above and other objects, features, aspects and advantages of the present invention will be more apparent from the following detailed description of the invention when taken in conjunction with the accompanying drawings.

DESCRIPTION OF THE PREFERRED EMBODIMENTS

Figure 3:
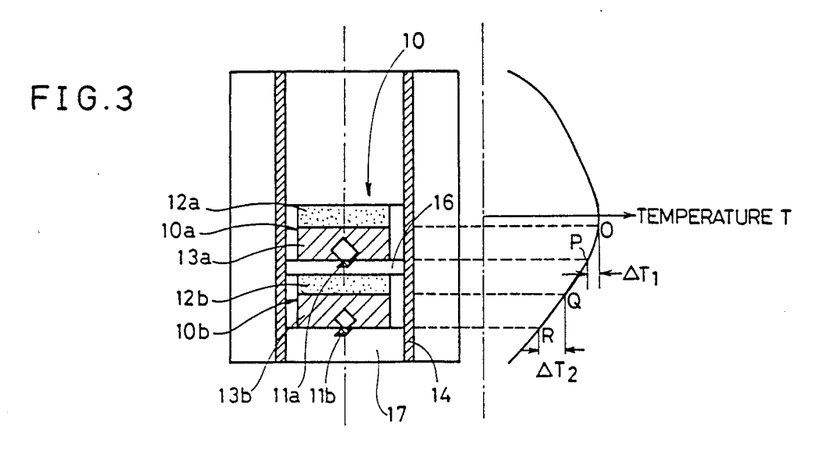
FIG. 3 is a cross sectional view of a synthesizing vessel employed in the present invention, which also illustrates a temperature gradient within the synthesizing vessel in the right-hand side.

FIG. 3 is a cross sectional view showing an example of a synthesizing vessel employed for carrying out the present invention. A synthesizing vessel 10 is arranged inside a cylindrical heater 14. The synthesizing vessel 10 is divided by a partition layer 16 into a pair of synthesizing chambers 10a and 10b. The partition layer 16 is prepared by a material not reactive to a solvent metal, such as pyrophyllite or sodium chloride (NaCl).

Solvent metal layers 13a and 13b are located in the synthesizing chambers 10a and 10b. Carbon sources 12a and 12b are arranged to be in contact with the upper portions of the solvent metal layers 13a and 13b, while seed crystals 11a and 11b are placed to be in contact with the lower portions thereof. In the embodiment as shown in FIG. 3, the seed crystals 11a and 11b are so embedded in the partition layer 16 and a bottom wall 17 that only the upper surfaces thereof are exposed. Such synthesizing vessel 10 as shown in FIG. 3 is disposed in a well-known superhigh pressure apparatus such as that disclosed in U.S. Pat. No. 3,297,407.

The feature of the synthesizing vessel 10 as shown in FIG. 3 resides in that the carbon sources 12a and 12b, the solvent metal layers 13a and 13b and the seed crystals 11a and 11b are arranged in the same direction in both of the synthesizing chambers 10a and 10b. The temperature gradient along the axial direction of the entire synthesizing vessel 10, i.e., the vertical direction, is as indicated in the right-hand side in FIG. 3. Namely, the temperature in the upper synthesizing chamber 10a is kept relatively higher than that in the lower synthesizing chamber 10b.

According to the present invention, a plurality of diamond crystals can be simultaneously grown utilizing the synthesizing vessel 10 as shown in FIG. 3. Description is now made on such process.

When the synthesizing vessel 10 as shown in FIG. 3 is adapted to synthesize diamond, temperature differences $\Delta T_1$ and $\Delta T_2$ are caused between the respective upper and lower end portions of the solvent metal layers 13a and 13b in the respective stages, i.e., the respective synthesizing chambers 10a and 10b. Such temperature differences are caused in the solvent metal layers 13a and 13b between portions in contact with the carbon sources 12a and 12b and those in contact with the seed crystals 11a and 11b.

Figure 4:
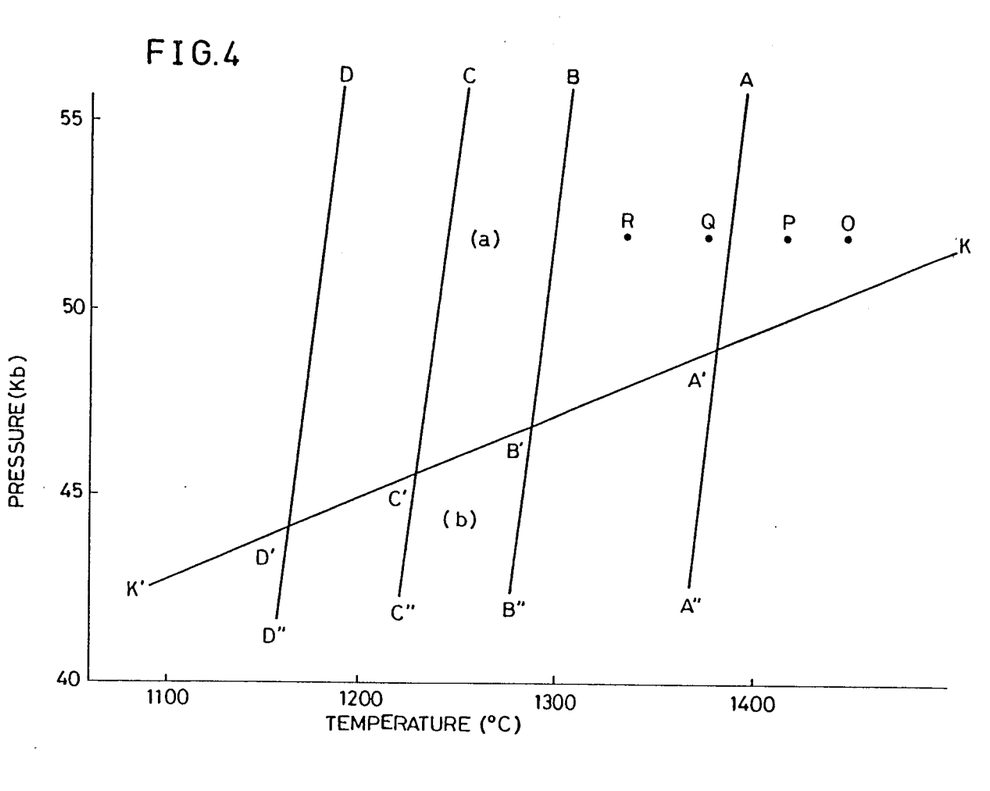
FIG. 4 is a diagram for illustrating the principle of the present invention, shown in which are pressure and temperature regions capable of synthesizing diamond.

On the other hand, FIG. 4 is an illustration showing a diamond-to-graphite equilibrium line and changes in eutectic temperatures of the employed solvent metals with respect to carbon. When, for example, the eutectic temperature of the solvent metal as employed is AA' in FIG. 4, diamond can be synthesized in the pressure-temperature region as defined by AA'K. Therefore, assuming that temperatures of the upper and lower ends of the solvent metal layer 13a in the upper synthesizing chamber 10a in FIG. 3 are respectively indicated by O and P and those of the upper and lower ends of the solvent metal layer 13b in the lower synthesizing chamber 10b are respectively indicated by Q and R, the values O, P, Q and R being as shown in FIG. 4, diamond crystals can be synthesized in both of the synthesizing chambers 13a and 13b by employing a metal whose eutectic temperature is indicated by AA' in FIG. 4 for forming the catalyst metal layer 13a in the upper synthesizing chamber 10a, while employing that whose eutectic temperature is indicated by BB' (see FIG. 4) for forming the solvent metal layer 13b in the lower chamber 10b.

The solvent metal having the eutectic temperature BB' may be considered applicable to both of the upper and lower stages, i.e., the synthesizing chambers 10a and 10b. However, although synthesis of diamond itself can be performed in both of the synthesizing chambers 10a and 10b, such application of the solvent metal is not preferable in view of synthesizing diamond crystals of high quality. This is because the quality of diamond crystals depends on synthesizing temperature conditions and hence considerable volume of impurities are inevitably trapped in the crystals when the diamond is synthesized under a temperature remarkably higher than the eutectic temperature of the solvent metal. Consequently, it is difficult to synthesize diamond crystals of high quality.

Needless to say, it is impossible to synthesize diamond in the lower stage, i.e., the lower synthesizing chamber 10b if the solvent metal having the eutectic temperature AA' is also employed in the synthesizing chamber 10b.

As hereinabove described, when the synthesizing vessel 10 as shown in FIG. 3 is employed, the solvent metal layers 13a and 13b different from each other in eutectic temperature with respect to carbon are located in the synthesizing chambers 10a and 10b respectively, whereby large diamond crystals of high quality can be grown simultaneously on the two seed crystals 11a and 11b.

Figure 5:
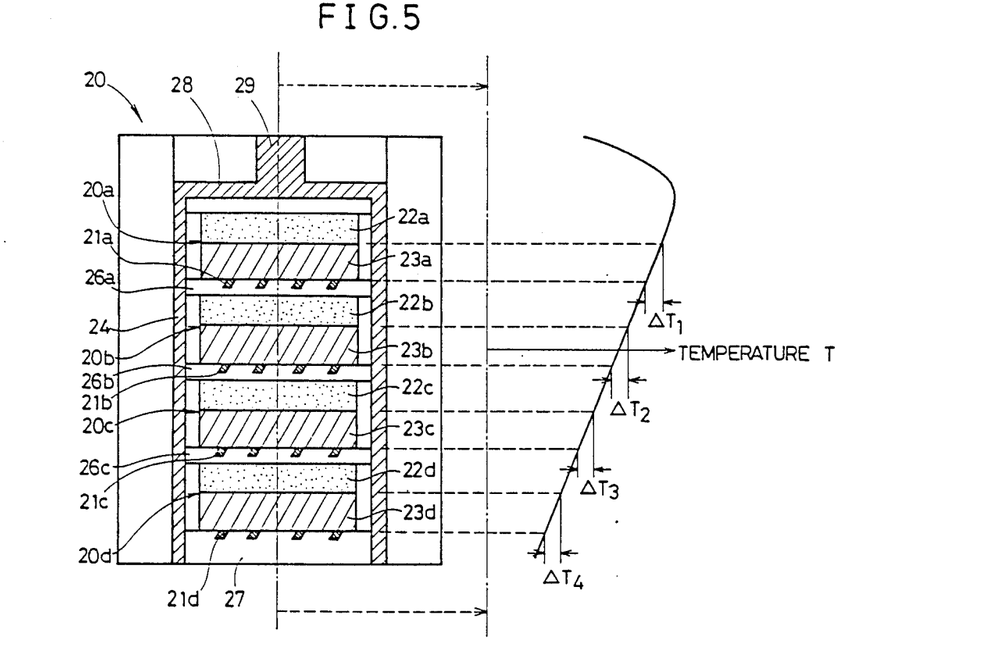
FIG. 5 is a cross sectional view showing another example of a synthesizing vessel employed in the present invention.

FIG. 5 is a cross sectional view showing another example of a diamond synthesizing vessel applicable to the present invention. A synthesizing vessel 20 as shown in FIG. 5 is entirely provided with a temperature gradient in a constant direction. In other words, the temperature is made to be lowered from the top stage toward the bottom of the synthesizing vessel 20 as shown in FIG. 5. Such temperature gradient can be attained by providing, on the upper portion of a cylindrical heater 24, a disc-shaped heater 28 which is adapted to close the cylindrical heater 24 and a heater 29 having a small section arranged in contact with the disc-shaped heater 28.

The synthesizing vessel 20 is divided in the axial, i.e., vertical direction into four stages by partition layers 26a, 26b and 26c, thereby to define divided synthesizing chambers 20a, 20b, 20c and 20d. The bottom portion of the lowermost synthesizing chamber 20d is defined by a bottom wall 27 of the synthesizing vessel 20.

Located within the respective stages, i.e., the respective synthesizing chambers 20a, 20b, 20c and 20d are carbon sources 22a to 22d, solvent metal layers 23a to 23d and seed crystals 21a to 21d successively from above. The seed crystals 21a to 21d are respectively placed in plural in the respective synthesizing chambers 20a to 20d.

In the synthesizing vessel 20 as shown in FIG. 5, diamond crystals can be synthesized simultaneously in the four synthesizing chambers 20a to 20d by the temperature difference method, by appropriately setting thickness values of the partition layers 26a to 26c and/or the solvent metal layers 23a to 23c and employing four types of solvent metals whose eutectic temperatures are different from each other as indicated by AA', BB', CC' and DD' in FIG. 4.

As hereinabove described, the present invention employs such a synthesizing vessel 10 or 20 as shown in FIGS. 3 or 5, namely, the respective synthesizing chambers are so constructed that diamond crystals are grown upwardly from seed crystals, whereby a number of large diamond crystals of high quality can be simultaneously obtained. In other words, although only one stage of a synthesizing vessel can be utilized in the conventional method based on the temperature difference method, a large-sized synthesizing vessel can be effectively utilized according to the present invention by applying such structure as shown in FIGS. 4 and 5, thereby to enable efficient mass production of diamond crystals, leading to remarkable reduction in synthesizing cost.

The solvent metals employed in the present invention may be prepared by well-known solvent metals generally applied to diamond synthesis, e.g., metals such as iron, cobalt, nickel, manganese and chrome, or alloys thereof, or alloys thereof and other metals. It is preferable to employ alloys including a prescribed volume of carbon as the solvent metals, in order to prevent dissolution of the seed crystals as described in Japanese Patent Laying-Open No. 69211/1981. Further, blue semiconducting diamond can be synthesized by adding boron (B) as described in the aforementioned literature by Wentorf, Jr. Similarly, transparent diamond can also be synthesized by adding nitrogen getter such as aluminum (Al), titanium (Ti) and zirconium (Zr).

The solvent metals different in eutectic temperature with respect to carbon may be selected from the aforementioned metals or alloys. For example, in the Ni-Mn alloy system, the eutectic temperature with respect to carbon under a pressure of 52 kb is continuously changed from 1400° C. to 1100° C. as the content of manganese (Mn) is increased from 0 to about 54 percent by weight. Therefore, solvent metals of appropriate alloy composition may be selected in compliance with the temperature gradient of the synthesizing vessel. It is to be noted that, in practice, the lower limit temperature for synthesizing diamond is higher by several ten degrees from the eutectic temperatures of the solvent metals and carbon under a specific pressure.

The carbon source as employed in the present invention is preferably prepared by graphite or a mixture of graphite and fine diamond powder.

The seed crystals are prepared by fine diamond particles. The partition layers for dividing the synthesizing vessel into a plurality of stages are in contact with the solvent metals, and hence required to be selected from materials not reactive to the same, e.g., oxides such as aluminum oxide ($Al_2O_3$), zirconium oxide ($ZrO_2$) and magnesium oxide (MgO), halides such as sodium chloride (NaCl) and potassium chloride (KCl), minerals such as pyrophyllite and talc, and various carbides and nitrides. The partition layers are also utilized as seed beds for the seed crystals, as shown in FIGS. 3 and 5. The vessel for containing the carbon sources, the solvent metal layers and the seed crystals is formed by a pressure medium such as pyrophyllite, NaCl and BN.

The temperature differences of the solvent metal layers required for carrying out the present invention are within the range of 10° C. to 150° C., preferably within the range of 20° C. to 100° C. The diamond growth rate is reduced when the temperature differences are insufficient, while no good crystals can be obtained if the temperature differences are excessive.

An apparatus for synthesizing diamond according to the method of the present invention is appropriately implemented by a belt or girdle type apparatus, and also by other superhigh pressure generator devices such as a cubic anvil device and a pistoncylinder type device. Pressure-temperature conditions for synthesizing diamond according to the present invention vary with the solvent metals as employed. In order to synthesize diamond of good quality, the cooler portions of the solvent metal layers in which the diamond crystals are grown must be heated at temperatures exceeding 1000° C., and the pressure required is over 40 kb.

Figure 6:
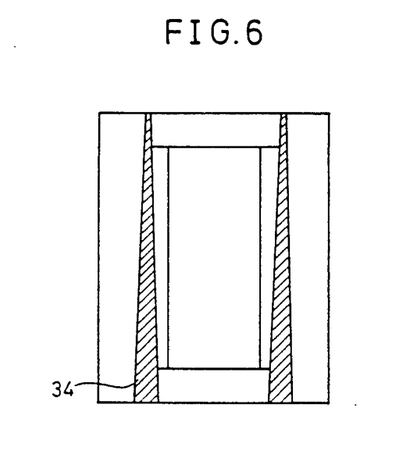
FIG. 6 is a schematic cross sectional view for illustrating an example of a heat generator employed for carrying out the present invention.
Figure 7:
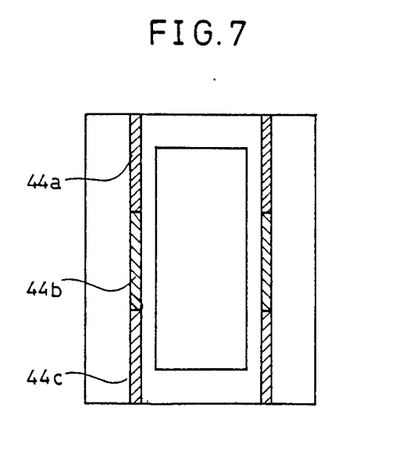
FIG. 7 is a cross sectional view for illustrating another example of a heat generator employed in the present invention.

Various methods are considered applicable for providing the synthesizing vessel with the temperature gradient in a constant direction. Applicable to the present invention are a method of varying the sectional shape of a heater 34 as shown in FIG. 6 thereby to heat the upper portion of the synthesizing vessel at a higher temperature, a method of dividing a cylindrical heat generator into a plurality of layers 44a, 44b and 44c as shown in FIG. 7 thereby to vary the materials of the heater layers in order to lower specific resistances of the layers successively from the top stage, and a combination of these methods.

Description is now made on Examples of the present invention.

EXAMPLE 1

A synthesizing vessel in the structure as shown in FIG. 5 was employed in this Example.

The solvent metal layer in each stage was 25 mm in diameter and 6 mm in thickness, and the uppermost stage was prepared by Ni, the second stage by 50Fe-50Ni alloy, the third stage by 64Fe-31Ni-5Co alloy, and the fourth stage by 40Fe-40Ni-20Mn alloy. The respective carbon source was formed by an embossed disc plate prepared by diamond powder and graphite powder mixed in the ratio of 2:1 by weight. Synthetic diamond crystals of about 0.7 mm in diameter were employed as the seed crystals, and embedded in partition layers of NaCl to be in contact with the bottom surfaces of the respective solvent metal layers. Seven seed crystals were applied to each stage. Pyrophyllite was applied as a pressure medium to the outer peripheral portion of the graphite heat generator, while the partition layers were prepared by NaCl. A girdle-type superhigh pressure press was employed. An electrical current was passed through the heater after giving pressure. As a result, the synthesizing vessel was heated under a pressure of 55 kb, so that the bottom surface of the Ni layer in the top stage is heated at a temperature of about 1450° C. The bottom surface temperature of the 40Fe-40Ni-20Mn alloy layer in the fourth stage was about 1220° C. at this time. These conditions were retained for 60 hours. As the result, diamond crystals of about 0.5 carat size were grown from the seed crystals in the respective stages, and the total yield was 35 carats.

EXAMPLE 2

The synthesizing vessel was in the same structure as Example 1, and the solvent metal layers were prepared by Ni, Ni-15Mn alloy, Ni-30Mn alloy and Ni-45Mn alloy successively from the top stage. The seed crystals were embedded in partition layers of NaCl. The pressure-temperature conditions were identical to those in Example 1, and retained for 60 hours. In the first synthesizing vessel employing Ni as the solvent metal, no spontaneous nucleation was observed. On the other hand, in the second to fourth synthesizing vessels, there were only a few spontaneous nucleations in portions other than seed crystals. However, the quality of the diamond crystals obtained in the second to fourth stages and grown on the seed crystals was the same as that obtained in the first vessel. In the synthesizing vessel employing the Ni-Mn solvent metals divided into two to four stages, small diamond particles were grown by spontaneous nucleation in addition to diamond crystals of 0.3 to 0.4 carat size grown from the seed crystals, and the total yield was 25 carats.

EXAMPLE 3

The synthesizing vessel was formed in the structure as shown in FIG. 3. The respective solvent metal layer was 12 mm in diameter and 5 mm in thickness, and the upper stage layer was prepared by 50Fe-50Ni alloy, the lower stage by 64Fe-31Ni-5Co alloy. The carbon sources were formed by embossed members of mixed powder of diamond and graphite similarly to Example 1. The seed crystals were prepared by synthetic diamond particles of about 0.7 mm in diameter, three in each stage. The synthesizing vessel was heated under a pressure of 52 kb so that the upper surface temperature of the upper solvent metal layer was 1400° C. It was estimated that the lower surface temperature thereof was about 1370° C., and the upper and lower surface temperatures of the lower solvent metal layer were 1350° C. and 1280° C. respectively at this time. These conditions were retained for 30 hours, and as a result, three diamond crystals of about 0.1 carat size were grown in the upper stage while three diamond crystals of about 0.3 carat size were grown in the lower stage.

Figure 8:
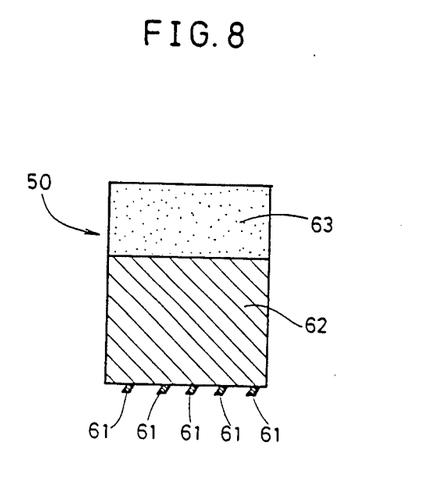
FIG. 8 is a cross sectional view for illustrating another embodiment of the present invention, in which a plurality of seed crystals are placed in a single synthesizing chamber.

It is understood from the aforementioned Examples 1 to 3 that large diamond crystals of high quality can be obtained according to the method of the present invention. The inventors have further found that larger diamond crystals of better quality can be obtained by placing seed crystals in the respective synthesizing chambers in a concentration in excess of a certain extent. In other words, when diamond is synthesized on the basis of the conventional temperature difference method as hereinabove described, a considerable amount of nucleation takes place in portions other than the seed crystals, thereby lowering the yield and quality of the diamond crystals grown on the seed crystals. Japanese patent laying open gazette No. 88289/1977 discloses the structure of providing a shielding layer for preventing nucleation between the solvent metal layer and the seed crystals, in order to overcome the aforementioned problem. However, it has been difficult to obtain large diamond crystals of high quality by this method, as hereinabove described. The inventors have found that large diamond crystals of high quality can be obtained without providing any shielding layer for preventing deleterious nucleation by locating a plurality of seed crystals 61 in a synthesizing chamber 50 to be in contact with a solvent metal layer 62 as schematically illustrated in FIG. 8, in a concentration of one or more to 1 cm². Numeral 63 in FIG. 8 indicates a carbon source. The concentration of the seed crystals may be in excess of 1/cm², and preferably within the range of 50/cm² in practice, in order to obtain large diamond crystals. According to the method of the present invention, there is no restriction in the types of the solvent metals to be employed, in contrast to the method as disclosed in Japanese patent laying open gazette No. 88289/1977. On the other hand, the characteristics of diamond single crystals greatly depend on the characteristics of the solvent metals employed for synthesizing the diamond crystals. Therefore, according to the present invention, the solvent metals can be freely selected in response to the characteristics to be obtained.

As hereinabove described, spontaneous nucleation in portions other than the seed crystals can be effectively prevented by locating a plurality of seed crystals in a concentration in excess of 1/1 cm² in a single synthesizing chamber for the following considerable reason: Under conditions for growing crystals of good quality, the number of nuclei as formed is in the range of zero to several tens with respect to the area of 1 cm² of regions capable of growing crystals, i.e., the base area of the solvent metal layer in most cases. It has been found that such nucleation is facilitated in the initial stage of crystal growth, and formation of nuclei is remarkably reduced with progress of crystal growth. In consideration of this point, it is supposed that, when seed crystals are placed at least in a number equal to or exceeding the number of crystals upon completion of nucleation, the number of nuclei as formed will not exceed this number. This supposition was confirmed by the following experiment made by the inventors:

An abrasive grain of synthetic diamond of about 0.5 mm was employed as a seed crystal and embedded in a NaCl disc plate of 20 mm in diameter, which was applied to a base plate for crystal growth. A disc plate of 49Fe-51Ni alloy was placed thereon as the solvent metal, on which a member of mixed powder of high purity graphite and diamond was placed as a carbon source. These members were contained with a pressure medium and an energizing heater in a superhigh pressure vessel, to be subjected to two experiments for retaining the same under a pressure of 52 to 54 kb and a temperature of 1340° to 1400° C. for 50 hours. Grown in the first experiment were five crystals of 0.2 to 0.4 carat size based on spontaneous nucleation in addition to a diamond crystal of 0.6 carat size grown on the seed crystal. One of the diamond crystals grown on the basis of the spontaneous nucleation was in contact with the diamond crystal grown on the seed crystal, and both diamond crystals were cracked at the contact portions upon releasing of the pressure. In the second experiment, six diamond crystals of 0.15 to 0.3 carat size were grown in addition to a diamond crystal of 0.7 carat size grown on the seed crystal.

Additionally, two experiments were respectively made on seed crystals in numbers of 0, 1, 4, 10 and 30 at regular intervals, under the same conditions as the aforementioned two experiments. Results were as shown in Table 1.

TABLE 1

| | Results of Experiments made on Different Numbers of Seed Crystals (average value of two experiments) | | | | |
|---|---|---|---|---|---|
| Number of Seed Crystals | Concentration of Seed Crystals (/cm²) | Number of Nuclei as formed | Total Yield (carat) | Yield of Crystal grown on Seeds | Weight per Crystal (carat) |
| 0 | 0 | 10.5 | 2.3 | 0 | 0.22 |
| 1 | 0.32 | 7.5 | 3.0 | 0.9 | 0.35 |
| 4 | 1.27 | 2.0 | 4.6 | 3.0 | 0.77 |
| 10 | 3.18 | 0.5 | 6.2 | 6.1 | 0.58 |
| 30 | 9.55 | 0 | 6.7 | 6.7 | 0.22 |

It has been confirmed from the results shown in Table 1 that the number of nuclei as formed besides seed crystals is reduced as the number of seed crystals is increased. Thus, it is understood that spontaneous nucleation can substantially completely be prevented by securing a sufficient number of seed crystals.

The aforementioned effective concentration of 1/cm² has been found by the inventors on the basis of the foregoing supposition and experiments. Definite Examples are now described.

EXAMPLE 4

An experiment was made by the same method and conditions as the experiments made in relation to the results in Table 1. The solvent metal was prepared by pure cobalt, and ten seed crystals were placed at regular intervals. These seed crystals were embedded in a NaCl disc plate. As the result, ten crystals of 0.23 to 0.44 carat/number were grown all on the seed crystals. The total yield was 3.9 carats. No nucleation was observed in portions other than the seed crystals.

EXAMPLE 5

An experiment was made with a solvent metal prepared by 70Fe-30Co and 60 seed crystals in the same method and conditions as Example 4. As the result, 58 crystals of 0.048 to 0.096 carat/number were grown all on the seed crystals. Two of the seed crystals were dissolved. The total yield of the crystals as obtained was 4.7 carats. No nucleation was observed in portions other than the seed crystals, similarly to Example 4.

EXAMPLE 6

An experiment was made with a solvent metal prepared powder metallurgically by 63.5Fe-32Co-4.5C in the same method and conditions as Example 5. As the result, 60 crystals of 0.63 to 0.11 carat/number were grown all on the seed crystals. No nucleation and no dissolving of seed crystals were observed in portions other than the seed crystals. The total yield of crystals as obtained was 5.3 carats.

EXAMPLE 7

An experiment was made using 120 seed crystals and retaining a reaction vessel for 60 hours in the same method as Example 6. Other conditions were the same as Example 6. As the result, 120 crystals of 0.25 to 0.41 carat/number were grown all on the seed crystals. No nucleation was observed in portions other than the seed crystals. The total yield of the crystals as obtained was 3.4 carats.

Although the present invention has been described and illustrated in detail, it is clearly understood that the same is by way of illustration and example only and is not to be taken by way of limitation, the spirit and scope of the present invention being limited only by the terms of the appended claims.

What is claimed is

1. A method of synthesizing diamond under diamond-stable superhigh pressure and temperature by employing carbon sources, solvent metals for dissolving said carbon sources and seed crystals to grow diamond crystals, said method comprising the steps of:
    preparing a synthesizing vessel divided into at least two synthesizing chambers by one or more partition layers;
    placing said solvent metals which are different from each other in eutectic temperature with respect to carbon, in the respective at least two synthesizing chambers of said synthesizing vessel, placing said carbon sources to be in contact with highest-temperature portions of said solvent metals and placing said seed crystals in contact with lowest-temperature portions of said solvent metals in respective ones of said divided synthesizing chambers, and
    growing diamond crystals in said solvent metals in respective ones of said divided synthesizing chambers, said growing step including providing a temperature gradient from a high temperature to a low temperature across said at least two synthesizing chambers.

2. A method of synthesizing diamond in accordance with claim 1, wherein:
    said at least two synthesizing chambers are arranged in a plutality of stages in the vertical direction;
    at least one heat generator is arranged in the outer peripheral portion of said synthesizing vessel for heating the same; and
    said synthesizing vessel is provided with the temperature gradient so that the upper part along the axial direction of said synthesizing vessel is at the high temperature and the lower part at the low temperature,
    said method further including a step of placing said plurality of solvent metals different in said eutectic temperature in respective said synthesizing chambers so as to place a solvent metal having relatively higher eutectic temperature with respect to carbon in the synthesizing chamber positioned in the upper part.

3. A method of synthesizing diamond in accordance with claim 2, wherein temperatures for synthesizing diamond in said synthesizing chambers are different from each other, the lower end of the solvent metal in the coolest synthesizing chamber being at a temperature in excess of 1000° C., the pressure for synthesizing diamond being in excess of 40 kb.

4. A method of synthesizing diamond in accordance with claim 1, wherein a plurality of said seed crystals are placed in contact with one solvent metal in respective ones of said synthesizing chambers.

5. A method of synthesizing diamond in accordance with claim 4, wherein said plurality of seed crystals are placed in contact with the one solvent metal in a concentration in excess of 1/cm² in regions capable of growing crystals.

6. A method of synthesizing diamond in accordance with claim 2, wherein a plurality of said seed crystals are placed in contact with one solvent metal in respective ones of said synthesizing chambers.

7. A method of synthesizing diamond in accordance with claim 6, wherein said plurality of seed crystals are placed in contact with the one solvent metal in a concentration in excess of 1/cm² in regions capable of growing crystals.

8. A method of synthesizing diamond under diamond-stable superhigh pressure and temperature, comprising the steps of:
    (a) preparing a synthesizing vessel divided into at least two synthesizing chambers;
    (b) positioning at least one seed crystal in each of the at least two synthesizing chambers;
    (c) positioning a solvent metal in contact with the at least one seed crystal in each of the at least two synthesizing chambers, the solvent metals in the at least two synthesizing chambers being different from each other in eutectic temperature with respect to carbon, each of the solvent metals having a high temperature portion and a low temperature portion which is in contact with the corresponding at least one seed crystal;

(d) positioning carbon sources in contact with the high temperature portions of the respective solvent metals in the respective at least two synthesizing chambers; and (e) growing diamond crystals in the solvent metals using diamond-stable superhigh pressure and temperature including providing a temperature gradient from a high temperature to a low temperature across the at least two synthesizing chambers.

9. A method of synthesizing diamond in accordance with claim 8, wherein:

said step (a) includes arranging the at least two synthesizing chambers in the vertical direction; and said step (e) includes arranging at least one heat generator along the outer peripheral portion of the synthesizing vessel to heat the synthesizing vessel, the synthesizing vessel having first and second ends and the temperature gradient being provided so that the first end of the synthesizing vessel is at the high temperature and the second end of the synthesizing vessel is at the low temperture.

10. A method of synthesizing diamond in accordance with claim 9, wherein said step (c) includes positioning the solvent metals having different eutectic temperature in the respective at least two synthesizing chambers so that a solvent metal having a relatively higher eutectic temperature with respect to carbon is in the one of the at least two synthesizing chambers at the first end of the synthesizing vessel.

11. A method of synthesizing diamond in accordance with claim 10, wherein said step (e) includes providing a temperature gradient so that the low temperature portion of the solvent metal in the synthesizing chamber at the second end of the synthesizing vessel is at a temperature in excess of 1000° C., and providing a pressure for synthesizing the diamond which is in excess of 40 kb.

12. A method of synthesizing diamond in accordance with claim 8, wherein said step (b) comprises positioning a plurality of seed crystals in each of the at least synthesizing chambers.

13. A method of synthesizing diamond in accordance with claim 12, wherein each of the solvent metals in the synthesizing chambers is placed in contact with the plurality of seed crystals so that the concentration is inexcess of one seed crystal per $cm^2$.

* * * * *

UNITED STATES PATENT AND TRADEMARK OFFICE
CERTIFICATE OF CORRECTION

PATENT NO. : 4,632,817
DATED : DECEMBER 30, 1986
INVENTOR(S) : SHUJI YAZU ET AL.

It is certified that error appears in the above-identified patent and that said Letters Patent is hereby corrected as shown below:

Col. 11, line 31, "the" (second occurrence) should be --a--.

Col. 14, line 1, "temperature" should be --temperatures--;

line 22, "inexcess" should be --in excess--.

Signed and Sealed this

Twenty-eighth Day of April, 1987

Attest:

DONALD J. QUIGG

Attesting Officer

Commissioner of Patents and Trademarks